US011411733B1

(12) United States Patent
Dailey et al.

(10) Patent No.: US 11,411,733 B1
(45) Date of Patent: Aug. 9, 2022

(54) SYSTEMS AND METHODS FOR IDENTITY AND ACCESS CONTROL

(71) Applicant: CITIBANK, N.A., New York, NY (US)

(72) Inventors: Robert M. Dailey, Richboro, PA (US); Charles Birk, Doylestown, PA (US)

(73) Assignee: CITIBANK, N.A., New York, NY (US)

( * ) Notice: Subject to any disclaimer, the term of this patent is extended or adjusted under 35 U.S.C. 154(b) by 240 days.

(21) Appl. No.: 16/535,763

(22) Filed: Aug. 8, 2019

(51) Int. Cl.
| G06F 9/54 | (2006.01) |
| H04L 9/32 | (2006.01) |
| H04L 9/00 | (2022.01) |
| G06F 21/60 | (2013.01) |

(52) U.S. Cl.
CPC .............. *H04L 9/3213* (2013.01); *G06F 9/54* (2013.01); *G06F 21/602* (2013.01); *H04L 9/006* (2013.01); *H04L 9/3226* (2013.01)

(58) Field of Classification Search
CPC ..... H04L 9/3213; H04L 9/006; H04L 9/3226; H04L 63/10; G06F 9/54; G06F 21/603; G06F 21/602; G06F 21/64
See application file for complete search history.

(56) References Cited

U.S. PATENT DOCUMENTS

| 9,615,253 | B1* | 4/2017 | Osborn | H04M 3/42314 |
| 2012/0158970 | A1* | 6/2012 | Livyatan | H04W 4/24 |
| | | | | 709/226 |
| 2017/0180346 | A1* | 6/2017 | Suarez | G06F 8/71 |
| 2018/0181417 | A1* | 6/2018 | Nallapareddy | H04L 63/10 |
| 2018/0278611 | A1* | 9/2018 | Tan | H04L 9/3268 |
| 2019/0102239 | A1* | 4/2019 | Caldato | G06F 9/547 |
| 2019/0305959 | A1* | 10/2019 | Reddy | G06F 8/60 |
| 2019/0319569 | A1* | 10/2019 | Morales | H02P 1/26 |
| 2020/0186423 | A1* | 6/2020 | Torres | G06F 9/45558 |
| 2020/0201981 | A1* | 6/2020 | Wardman | G06F 21/44 |
| 2021/0051573 | A1* | 2/2021 | Miklos | H04W 48/18 |

\* cited by examiner

*Primary Examiner* — Tongoc Tran
(74) *Attorney, Agent, or Firm* — Johnson, Marcou, Isaacs & Nix, LLC; George Marcou; Scott A. Hendrix

(57) ABSTRACT

Identity and access control systems and methods employ a registry that receives a request for confidential data from a client, together with a secure enrollment profile identifier for the client, and generates and sends a challenge token to the client, which encrypts and returns the encrypted challenge token to the registry. Thereafter, the registry confirms that the encrypted challenge token is validly encrypted and calls up a security backend with authorization to provide the requested confidential data to client, and the security backend sends the requested confidential data to the client.

19 Claims, 6 Drawing Sheets

SYSTEMS AND METHODS FOR IDENTITY AND ACCESS CONTROL

FIELD OF THE INVENTION

The present invention relates generally to systems and methods for identity and access control, and more particularly to technological solutions implementing systems and methods for identifying and controlling access to privileged and confidential data.

BACKGROUND OF THE INVENTION

Currently, identifying and managing temporary and permanent services and systems for the purpose of authenticating and identifying such services and systems for privileged access to secret information, such as passwords, private key certificates, and the like is problematic for an enterprise. Further, it is presently extremely difficult, if not impossible, for such an enterprise to understand and interact with varying systems that often seem to have no inventory that is manageable or identifiable. Moreover, enterprises typically use multiple technologies and many different systems, servers, and services, such as microservices, and keeping track of all of such technologies, systems, servers, and services is very difficult. It is also very difficult to provide authentication information to enable them to access other systems, servers, and services.

There is a current need for systems and methods for identifying and controlling access to secret and confidential information which addresses these legacy problems.

SUMMARY OF THE INVENTION

Embodiments of the invention advance the technical field by addressing problems associated with the above described currently employed mechanisms, as well as advancing peripheral technical fields. Such embodiments are directed to technological solutions that may involve a system that may include, for example, one or more processors of a registry coupled to memory and programmed to receive, from one or more processors executing client programming, a request for confidential data, together with metadata consisting at least in part of a secure enrollment profile identifier for the client, and to generate and send a challenge token to the one or more processors executing the client programming; and the one or more processors executing the client programming being programmed to encrypt and return the encrypted challenge token to the one or more processors of the registry.

Such system may further involve, for example, the one or more processors of the registry being further programmed to confirm that the encrypted challenge token is validly encrypted and to call up, via an application programming interface, one or more processors of a security backend with authorization to provide the requested confidential data to the one or more processors executing the client programming; and the one or more processors of the security backend being programmed to provide the requested confidential data and send the requested confidential data to the one or more processors executing the client programming.

In an aspect of embodiments of the invention, the one or more processors of the registry may, for example, be further programmed to receive, from one or more processors of an orchestrator, data representing a build request for the client programming comprising details of the requested build and a nonce associated with the requested build. In a further aspect, the nonce associated with the requested build may comprise, for example, a single-use, time-limited randomized decimal string unique identifier associated with the requested build. In another aspect, for example, the details of the requested build may comprise, for example, one or more of an environment identifier, an application identifier, a container storage interface identifier, a platform identifier, a hard drive identifier, a CPU identifier, an operating system identifier, a MAC address, an IP address, or a work order identifier associated with the requested build.

Another aspect of embodiments of the invention may involve, for example, one or more processors of a security trust service coupled to memory and programmed to receive, from the one or more processors of the registry, the data representing the build request for the client programming, to generate a cryptographic fingerprint for the requested build based at least in part on the details of the requested build and the nonce associated with the requested build, and to generate a secure enrollment profile identifier for the requested build based on the cryptographic fingerprint. In an additional aspect, the one or more processors of the registry may, for example, be further programmed to receive, from the one or more processors of the security trust service, via the one or more processors executing the client programming, the secure enrollment profile identifier for the requested build, and to store the secure enrollment profile identifier.

In still another aspect of embodiments of the invention, the client programming may comprise, for example, one of a client virtual machine, a client application, a client system, or a client microservice. In a further aspect, the requested confidential data may comprise, for example, a public key infrastructure certificate. In a still further aspect, the requested confidential data may comprise, for example, a password. In an additional aspect, the challenge token may comprise, for example, a Boolean challenge.

In another aspect of embodiments of the invention, the one or more processors executing the client programming may, for example, be further programmed to encrypt the challenge token with the secure enrollment profile identifier generated by one or more processors of a security trust service communicably coupled to the one or more processors executing the client programming. In a further aspect, the one or more processors of the security trust service may, for example, be further programmed to generate the secure enrollment profile identifier based on a cryptographic fingerprint generated by the one or more processors of the security trust service.

In a still further aspect of embodiments of the invention, the one or more processors of the security trust service may, for example, be further programmed to generate the cryptographic fingerprint based at least in part on details of a requested build for the client programming and a nonce associated with the requested build. In an additional aspect, the one or more processors executing the client programming may, for example, be further programmed to encrypt the challenge token with a randomized hash value using the secure enrollment profile identifier generated by one or more processors of the security trust service.

In still another aspect of embodiments of the invention, the security backend may comprise, for example, one or more processors of a public key infrastructure service. In additional aspects, the security backend may comprise, for example, one or more processors of a password store. In further aspects, the security backend may comprise, for example, one or more processors of an enterprise's internal security backend.

Embodiments directed to the technological solutions described herein may also involve a method that may employ computer hardware and software, including, without limitation, one or more processors coupled to memory and non-transitory computer-readable storage media with one or more executable programs stored thereon which instruct the processors to perform methods that may involve, for example, receiving, by one or more processors of a registry coupled to memory, from one or more processors coupled to memory and executing client programming, a request for confidential data, together with metadata consisting at least in part of a secure enrollment profile identifier for the client and generating and sending, by the one or more processors of the registry, a challenge token to the one or more processors executing the client programming; and encrypting and returning, by the one or more processors executing the client programming, the encrypted challenge token to the one or more processors of the registry.

Such method may further involve, for example, thereafter confirming, by the one or more processors of the registry, that the encrypted challenge token is validly encrypted and calling up, by the one or more processors of the registry, via an application programming interface, one or more processors of a security backend with authorization to provide the requested confidential data to the one or more processors executing the client programming; and providing and sending, by the one or more processors of the security backend, the requested confidential data to the one or more processors executing the client programming.

Other aspects of embodiments of the invention may involve, for example, receiving, by the one or more processors of the registry, from one or more processors of an orchestrator, data representing a build request for the client programming comprising details of the requested build and a nonce associated with the requested build. Further aspects may involve, for example, receiving, by one or more processors of a security trust service coupled to memory, from the one or more processors of the registry, data representing the build request for the client programming, generating, by the one or more processors of the security trust service, a cryptographic fingerprint for the requested build based at least in part on the details of the requested build and the nonce, and further generating, by the one or more processors of the security trust service, a secure enrollment profile identifier for the requested build based on the cryptographic fingerprint.

Additional aspects of embodiments of the invention may involve, for example, receiving, by the one or more processors of the registry, from the one or more processors of the security trust service, via the one or more processors executing the client programming, the secure enrollment profile identifier for the requested build, and storing, by the one or more processors of the registry, the secure enrollment profile identifier.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
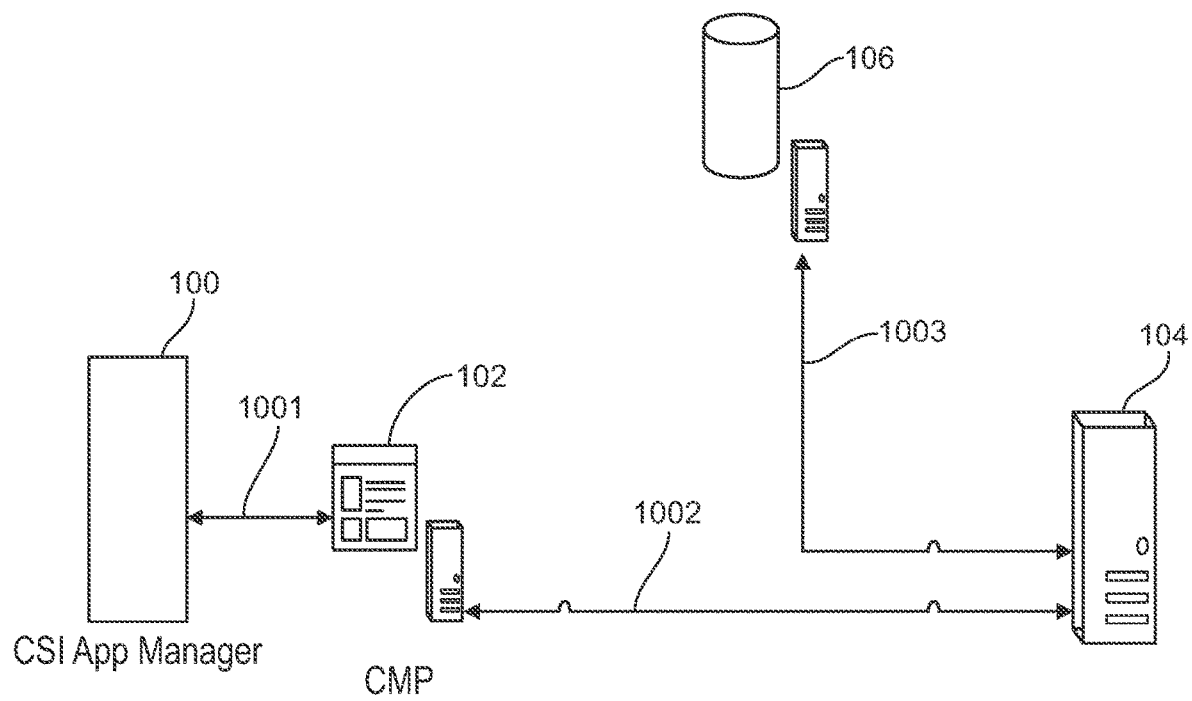
FIG. 1 is a schematic diagram showing examples of components and the flow of data between components in a metadata management process for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention covers such modifications and variations that come within the scope of the invention.

Embodiments of the invention provide secure identification, for example, of servers, applications and for their integrity and where needed, may also bridge an inventory gap for temporary and dynamic systems. In addition, such embodiments are suitable and scalable for "classical" servers, as well as internal, external, and hybrid cloud and container platforms and provide a seamless "as-a-service" application programming interface (API) flow for strong cryptographic integrity and authentication for other services, for example, external to a crypto integrity service, including classical "servers" as well as modern temporary and dynamic systems. It is to be understood that as used herein the term "as-a-service" may refer to various products, tools and technologies that may be delivered to users as a service over a network, such as the Internet, rather than provided locally or on-site within an enterprise.

Embodiments of the invention may also provide, for example, an open API and flexible framework for other applications and systems to consume the knowledge of an online registry of trust and opinionated security integrity service (referred to herein as the "registry"), as well as to provide accelerated trust and integrity validation to those systems and to third parties. Still further, embodiments of the invention provide, for example, a centralized and consumable inventory of integrity services, systems, integrations, key usage, and certificate deployment.

Aspects of embodiments of the invention may involve, for example, generating an inventory that is pre-populated by trusted systems which an enterprise may allow to manage other systems of the enterprise. Some of such trusted systems may be built by the enterprise; some may be systems of third party vendors; and some may be cloud provider-based interfaces. In such aspects, once an enterprise designates, for example, a particular system as a trusted provider for building a system or microservice, the enterprise may decide what credentials may be used by the system to authenticate itself, since such systems are highly static and provide information to the enterprise about systems which they are building. The term "microservice" may be characterized as a software development technique that focuses, for example, on building single-function modules with well-defined interfaces and operations.

In addition to information about a system or microservice that is being built by a trusted system, information such as to whom such system or microservice belongs, what type of system or microservice it is, and whether it is for production or testing, the enterprise may also include a nonce. Such nonce may be, for example, a one-time-use random string that is used by the enterprise as an initial password for identifying the system or microservice that expires after a predetermined time-out period. When a system or microservice is built by one of such trusted provider platforms, the trusted platform may notify the enterprise in advance that it has built such system or microservice. The trusted provider platform may also notify the enterprise of the random nonce value that it provided to the system or micro-services that was built.

Upon receipt of such information, the enterprise may set a timer for the system or microservice to come online and identify itself so that the enterprise may put the system or microservice into an inventory and complete the build process. The nonce and other information about the newly built system or microservice may be used as part of a registration of the newly built system or microservice. The enterprise may validate that the newly built system or microservice has not been used and that it is valid. The enterprise may complete the registration of the newly built system or microservice which involves creation of an inventory of such system or microservice.

An aspect of the registration process for embodiments of the invention may be a cryptographic fingerprinting of the system or microservice. Such cryptographic fingerprinting may include information about the system or microservice, such as the operating system, access, physical and virtualized hardware, and user requirements for which the system or microservice is running. The information included in the cryptographic fingerprint may be generated by a system employed by the enterprise and stored in a centralized database of the enterprise housing confidential internal data.

Another aspect of embodiments of the invention may involve, for example, a system on top of the inventory which provides an access control platform that may enable system or microservice owners to provide information in advance, in a single touch, to build and/or destroy and to pre-populate at least some access controls. Such information may include, for example, passwords, certificates, and keys to which such system or microservice owners may have access, as well as services to which they may have access such as onboarding intelligent security appliances and access lists for firewalls and micro-firewalls.

It is to be understood that at least some such systems that are built, particularly microservices, may typically exist for only a short period of time, such as only a few hours to only a few days. Embodiments of the invention may enable owners of such systems to be given access automatically in advance. In embodiments of the invention, systems that are built may include applications, microservices, as well as large systems platforms, and it is not necessary for the builders to include any form of secret information in such systems or to include credentials, for example, for database servers or private keys for communication in enterprise web services.

Thus, in a fully automated online aspect of embodiments of the invention, a trusted platform may notify the enterprise in advance that a particular system is being built, the owner of the system, what the enterprise should expect, and to what services the system has access. It is not necessary to provide, for example, any production data information, database credentials, or the like, which are all available as a result of the fully automated end-to-end registration process. For example, owners may obtain access to services for decryption of data which they need to have decrypted come online as fully functioning services. A firewall aspect for embodiments of the invention may also provide identity and access control that enables spin-up of external-facing cloud hosted systems in a secure fashion. Access control for embodiments of the invention may enable, for example, giving access to secrets which can be offboarded into other platforms.

In embodiments of the invention, it is possible to see in real time to which systems other systems may have access, which is not possible with current technology. Current technology does not afford any way to readily determine where credentials are being dropped or stored or with what entity or entities they are being shared. For example, embodiments of the invention may provide real-time access to revoke credentials based upon failing a cryptographic fingerprint identification or based upon a determination via the automated platform that a particular application is no longer an application and is thus no longer accessible on the database by any system.

Aspects of embodiments of the invention may involve, for example, one or more metadata administration interfaces, metadata inventory databases, and service middleware. In the metadata administration interface aspect, for example, a cloud management platform may be used as the method for container storage interface (CSI) manager-approved workflows to manage application and system metadata as a type of extension for security and policy to buffer CSI. This may include items such as custom uniform resource locators (URLs) for application interfaces, supported common interface (CI) interfaces, locations of deployed systems including "cloud" and assurance level definitions for data trust services policy enrollment.

Such "cloud" systems may include, for example and without limitation, certificate-as-a-service (CAS), platform-as-a-service containerization software platforms such as OPENSHIFT™, multi-cloud application platforms such as Pivotal Cloud Foundry (PCF), cloud computing platforms such as AZURE™, cloud web services such as AMAZON™ web services (AWS™) cloud, and such data trust services may include, for example and without limitation, IONIC™ data trust services. The metadata inventory database aspect may involve, for example, a distributed metadata inventory database (referred to herein as CIDB), which may include metadata provided by cloud management platform requests, as well as the dynamic systems inventory. The service middleware aspect may involve, for example, open and standardized application programming interfaces (APIs) for the registry middleware.

FIG. 1 is a schematic diagram showing examples of components and the flow of data between components in a metadata management process for embodiments of the invention. Referring to FIG. 1, such components may include, for example, a processor executing CSI app manager 100 programming, one or more processors of a cloud management platform 102, one or more processors of the online registry of trust and opinionated security integrity service referred to as the "registry" 104, and the non-relational distributed database referred to as the CIBD database 106.

Referring again to FIG. 1, at 1001, 1002, the processor of the CSI app manager 100 may employ the one or more cloud management platform processors 102 to manage the overall CSI-related record information for an application. This may include details such as which crypto or other functions should be enabled for automation and support information. Referring further to FIG. 1, at 1003, the one or more registry processors 104 may perform necessary updates, such as cryptographic timestamps and signatures from the registry 104 middleware, to the CIBD 106 database after approvals.

Figure 2:
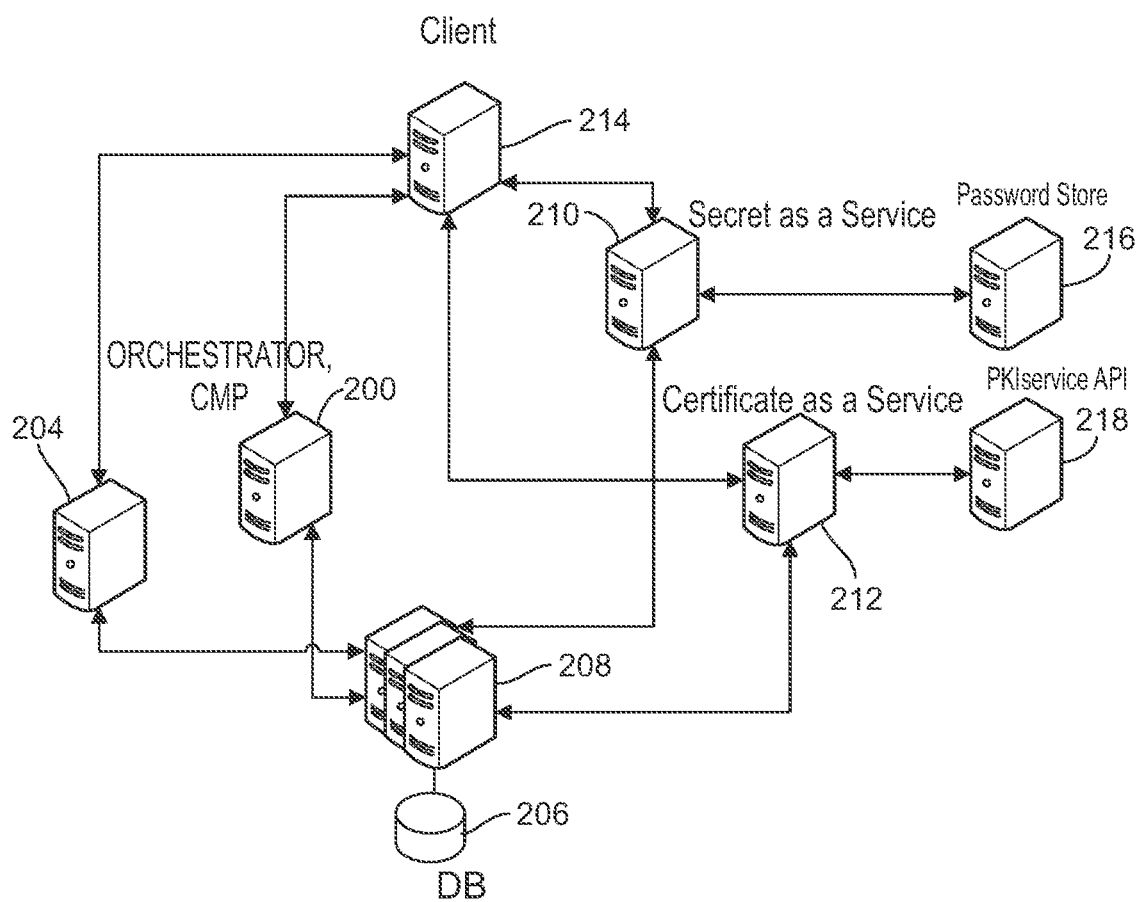
FIG. 2 is a schematic diagram showing examples of components and the flow of information between components for embodiments of the invention.

FIG. 2 is a schematic diagram showing examples of components and the flow of information between components for embodiments of the invention. Referring to FIG. 2, such components may include, for example one or more processors of an orchestrator 200, such as a trusted provider build platform which orchestrates a system build event, and one or more processors of a security trust service 204, such IONIC™, which may perform encryption/decryption services employed, for example, in cryptographic fingerprinting. Other components may include, for example, a non-relational (noSQL) distributed document database 206 referred to herein as CIDB, such as MONGODB™, which is a database utilized by the one or more processors of the registry 208; one or more processors of services such as secret-as-a-service 210 and certificate-as-a service 212 used by the one or more processors of the registry 208; and the client 214, which is may be a system that is being built.

Referring again to FIG. 2, in a system build event, the one or more processors of the orchestrator 200 may call in to the one or more processors of the registry 208 to a build a new client system 214, such as a Docker container or a virtual machine. In embodiments of the invention, automation orchestrators, such as orchestrator 200, may employ a platform-as-a-service containerization software platform, such as OPENSHIFT™, or a certificate-as-a-service platform to generate a request, such as 'Registration' or 'Deactivation', to middleware of the registry 208.

Referring further to FIG. 2, the one or more processors of the orchestrator 200 may provide details regarding, for example, environment, container storage interface number, and platform about the new client system 214 to the one or more processors of the registry 208. Such details may include, for example, an application number, an operating system such as LINUX, an IP address, a work order number or an internal ticket number used to initiate the build process. Such information may also include notification that an existing system is being retired, either temporarily or permanently, so that it can marked as such. The one or more processors of the orchestrator 200 may push notifications to the registry 208 API, and the one or more processors of the registry may perform inventory checks and necessary updates.

Referring still further to FIG. 2, the one or more processors of the orchestrator 200 connected to the client system 214, may reach out to the one or more processors of the registry 208 with that information and may also pass a nonce, which may be a single-use, time-based randomized decimal string, such as an Industry Standard Universal Unique Identifier (UUID), to the one or more processors of the registry 208. When the building of the client 214 is completed, a final step in the process my involve, for example, performing cryptographic fingerprinting by the one or more processors of the security trust service 204, such as IONIC™. This may be performed using the nonce provided by the enterprise as an initial password along with a set of software development tools, such as an IONIC™ software development kit (SDK). Such cryptographic fingerprinting may also include other information, such as a hard drive identifier, a sector identifier, the CPU model, an account identifier, a MAC address, and the like.

Referring further to FIG. 2, in a final step, the client 214 may call into the one or more processors of the security trust service 204 and the one or more processors of the registry 208, and if the one or more processors of the registry have no data regarding the client 214, for example, because the nonce is either non-existent, was not provided, or was already used, a security event may be generated. Otherwise, if the nonce is validated, the one or more processors of the security trust service 204 and the one or more processors of the registry 208 may finish the registration process. In doing so, the one or more processors of the security trust service 204 may generate a unique new secure enrollment profile (SEP) identifier for the client 214 based upon the cryptographic fingerprint, which may be stored on the registry 208 to identify the client 214.

If a secure enrollment profile (SEP) does not exist, an assertion may be pre-created and sent to one or more processors of the security trust service 204 for action. A security trust service 204 SEP assertion may be generated by the one or more processors of the registry 208. The security trust service 204 signed SEP assertion may be fetched by the new system 214 (also referred to herein from time-to-time as the "endpoint") during first startup via a registry 208 'client' script. The client 214 may complete the SEP enrollment against the security trust service 204 and is thus identifiable and provable. It is to be understood that the IONIC™ security trust service mentioned herein is an example only and that embodiments of the invention may employ any other suitable security trust platform, for example, for generating the unique identifier for the client 214 based upon predefined details.

Once registration for the client 214 is finished, the client may commence consuming registry services, such as secret-as-a-service 210 or certificate-as-a-service 212. Secret-as-a-service 210 and certificate-as-a-service 212 may be embodied at least in part in microservice functionality built into the registry 208 that provides secrets, such as passwords, and public key infrastructure (PKI) certificates. In addition, the secret-as-a-service microservice of the registry 208 may communicate with one or more processors of a variety of privileged access security backends, such as password store 216 and PKI service API 218. Examples of a privileged access security backend may include CYBERARK™, as well as an enterprise's own backend storage of the registry 208.

Additional aspects of embodiments of the invention external to the registry 208 may include, for example, "crypto-as-a-service" which may involve automated certificate enrollment and provisioning, data trust services policy modifications for new systems, and hardware security module (HSM) client on-boarding, particularly in a 'HSM-as-a-service' model with next-generation HSMs. Such additional aspects may also include, for example, automated platform/service integrity validation, rooted on a data trust service 204 SEP and software development kit (SDK), secured over verified blind exchange (VBE).

Further, such additional aspects may include, for example, utilizing secret-as-a-service 210 to enable dynamic systems, such as containers, to be bundled without sensitive materials such as keys and passwords, and enable automation to obtain those objects at initialization time. Such additional aspects may also include, for example, micro, macro, and identity and access management (IAM) policy-as-a-service which may involve the definition, management, and validation of access policy tied back to the CSI approver for providing full automation of these security facets. This may enable a computer assisted review tool (CART) process to be an approver, for example, for cloud IAM policy based upon business submission, preventing missed or inaccurate services rights. For example, if a need for S3 cloud storage resources is not specified during the CART process, no IAM policy may allow it, thus preventing accidental data leakage. For another example, a "zero trust" security model may be effectively enabled with full auditing and automation capabilities.

In embodiments of the invention, crypto-as-a-service may provide application or system-initiated, fully automatable, certificate issuance and lifecycle management. Crypto-as-a-service may provide the same levels of assurance and automation to existing enterprise cryptographic solutions, such as HSM onboarding and data trust services policy modifications. In addition, crypto-as-a-service may also provide the same levels of assurance and automation to new enterprise cryptographic solutions, such as encrypted ZIP-as-a-service, data protection-as-a-service, policy management-as-a-service, document classification-as-a-service, code and container signing-as-a-service, and cloud HSM-as-a-service.

Referring again to FIG. 2, in a certificate request process via crypto identification and API, the client 214, such as an application or server, may perform open API requests to the one or more processors of the registry 208 containing, for example a certificate signing request, or to request information, along with required metadata about the application or server. Upon receiving the request, the one or more processors of the registry 208 may validate that the requesting application 214 is registered in the CIDB 206 and that a data trust services 204 SEP is registered for the application. If not, and a container storage interface (CSI) in the CIDB 206 allows automation, registration may take place.

Referring again to FIG. 2, crypto middleware of the registry 208 may request the one or more processors of the registry to provide a challenge for the requestor 214 and to send the challenge to the requestor. It may be necessary for the requesting system 214 to reply and encrypt the token for validation, which is handled by the one or more processors of the registry 208. A failure is a security event that may be logged, for example, to a searchable repository that captures, indexes, and correlates real-time data, such as SPLUNK™. After successful validation of the token, the crypto middleware of the registry 208 may process the request. In the case of a public key infrastructure (PKI) certificate, the request may be validated, processed, and provided back to the requester 214.

Referring once again to FIG. 2, the client 214 may initiate a request, for example, for a password, such as DBuser1 on DBhost1, to one or more processors of the secrets-as-a-service 210 used by the one or more processors of the registry 208, and the one or more processors of the secrets-as-a-service 210 may return a challenge to the client 214. Upon receiving the challenge, the client system 214 may generate a randomized value that is a hashed copy of stored information, encrypt the randomized value using, for example, the security trust service 204, and return a response including the encrypted randomized value to the one or more processors of the secrets-as-a-service 210 together with the original request.

Thus, an application 214 that wishes, for example, to consume a security service, such as a secret retrieval, may call to a secrets API requesting action, whereupon, the secrets API may call to the one or more processors of the registry 208 requesting a token for the request validation. The secrets API may instruct the application 214 to encrypt and replay the token. Upon receiving the response, secrets-as-a-service 210 may call the one or more processors of the registry 208 to validate the response received from the client 214, and the response may be passed to the one or more processors of the registry 208 for validation. The one or more processors of the registry 208 may validate that the application 214 is registered in the CIDB 206 with a SEP, or if not the validation fails.

Validation of the response may involve, for example, validating that the encrypted challenge was properly encrypted, decrypting the encrypted challenge, validating that the unique identifier from the security trust service 204 was used to encrypt the message, and then validating that the details inside the request message were not tampered with or compromised in any way. If such validation fails, a security event may occur whereupon the request message is rejected. If successful, the one or more processors of the registry 208 may provide identification and authentication validation.

If the request message was validly encrypted and includes the unique identifier, the request message may be validated, and the one or more processors of the registry 208 may check to see if the client 214 has access to what it is requesting. If not, the request may be rejected and a security event may be created. Failures may be treated as login failures and logged to a searchable repository that captures, indexes, and correlates real-time data, such as SPLUNK™, by the one or more processors of the registry 208.

If the client 214 is entitled to the requested access, the request may be processed, and the requested password may be retrieved, for example, from one or more processors of the privileged access security backend 216 or from backend storage of the registry 208, depending on where the requested password may be stored. Thereafter, the retrieved data may be encrypted and sent to the client 214 so the data cannot be intercepted in transit and used by an unauthorized entity. In embodiments of the invention, the cryptographic fingerprint may validate that the encrypted data was received by the correct client 214. If the cryptographic fingerprint does not align with the client 214, the encrypted payload cannot be decrypted, and the client machine cannot use the retrieved, encrypted password.

In embodiments of the invention, the same data flow that occurs, for example, in a request to one or more processors of the secret-as-a-service 210 for a password may similarly occur in a request to one or more processors of the certificate-as-a-service 212. The one or more processors of the certificate-as-a-service 210 may interface, for example, via PKI service API 218 with third-party applications employed by an enterprise that use certificate generation. Information may already exist in a particular application concerning what types of certificates that may be used, what may be included in the certificate, and whether to furnish a new or an existing certificate or key.

A cloud security-as-a-service aspect of embodiments of the invention may involve, for example, PKI-signed identity access management (IAM) files. In such an aspect, default global security policy for a cloud services platform, such as AWS, may be set, for example, to "no access" to prevent any rogue systems or misconfigured systems from having any access rights, internal or external, which may have a major impact in preventing "open share" disclosures.

Further, in such aspect, IAM configuration for an application may be uploaded to the CIDB 206, signed by an enterprise PKI service after approvals, and referenced by any orchestrator middleware as part of the token authentication process to enable/disable the particular IAM policy in real time and fully automated. The foregoing may include, for example, external cloud as well as internal micro and macro segmentations. Additionally in such aspect, IAM approvals may be a part of the CART workflow. Thus, if an application's need for service X is not disclosed, an IAM may not allow service X, and if the application is not entitled to use native function Y, the IAM may not allow native function Y.

The cloud security-as-a-service aspect of embodiments of the invention may also involve a machine security gate. For example, the crypto API may be extended slightly to allow periodic check-in of one or more processors of a host using the same token validation challenge, which may record a timestamp of the check-in evidencing that the system is currently online and properly functioning. The timestamp may be used for real-time rule/policy disablement of inactive or lost systems and services, thereby promptly closing a security gap. The metadata established for the system may also be used to close access to dirty or vulnerable "golden images" (e.g., a cloned disk used as a template or master image for virtual hardware).

In a transparent dual factor authentication aspect of embodiments of the invention, a data trust service JAVASCRIPT™ API may be embedded, for example, into a Security Assertion Markup Language (SAML)/single sign-on (SSO) login page, and be inserted into the SAML chain. Such aspect may allow a policy decision based, for example, on the SEP as a binary authentication factor, in addition to a password, and may require data trust services files and JAVASCRIPT™ API products, such as a user desktop component.

Figure 3:
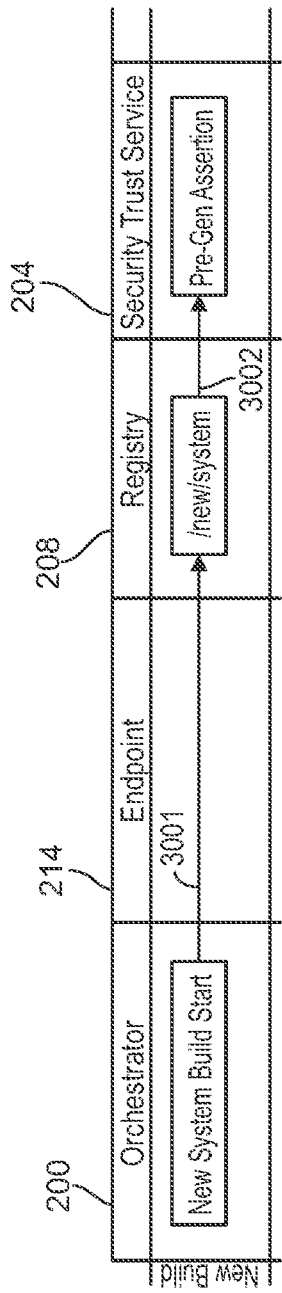
FIG. 3 is a cross-functional flow diagram showing examples of components and the flow of data between components in a process of building a new system for embodiments of the invention.

FIG. 3 is a cross-functional flow diagram showing examples of components and the flow of data between components in a process of building a new system for embodiments of the invention. Referring to FIG. 3, components may include, for example, one or more processors of the trusted build platform referred to as the orchestrator 200, the client machine, application or the like referred to as the endpoint 214, the one or more processors of the registry 208, and one or more processors of the encryption platform security trust service 204. Referring further to FIG. 3, for a new system build, at 3001, the one or more processors of the orchestrator 200 may initiate a call to the one or more processors of the registry 208, advising that it is building a new system 214 and providing some basic information that includes a nonce. At 3002, the one or more processors of the registry 208 may then forward the received information with the nonce to the one or more processors of the security trust service 204.

Figure 4:
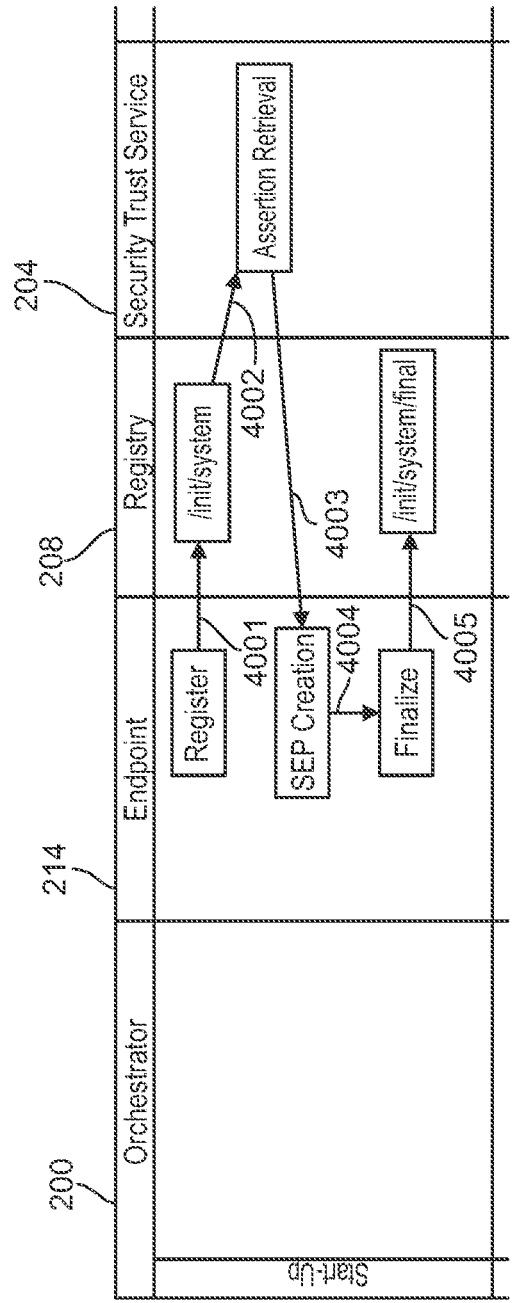
FIG. 4 is a cross-functional flow diagram showing examples of the components shown in FIG. 3 and the flow of data between components in a process of starting up a system for embodiments of the invention.

FIG. 4 is a cross-functional flow diagram showing examples of the components shown in FIG. 3 and the flow of data between components in a process of starting up a system for embodiments of the invention. Referring to FIG. 4, for a system or application startup, at 4001, the endpoint 214 may call in to the one or more processors of the registry 208 to complete registering itself and to advise, for example, that it is expected by the registry and may provide its information to the registry. At 4002-4003, the one or more processors of the registry 208 may then provide information back to the endpoint 214 about the security trust service 204 registration components that are outside of the registry, which the endpoint 214 may then use at 4004 to finalize its registration. For example, the one or more processors of the security trust service 204 may perform finger-printing of the endpoint 214 and generate a finger-print and unique identifier for the endpoint system 214. The registration is completed only if the one or more processors of the registry 208 confirms that the endpoint system 214 is permitted to do so, and one or more processors of the endpoint system 214 calls back to the one or more processors of the registry 208 at 4005 with the unique identifier and ends the startup process.

Figure 5:
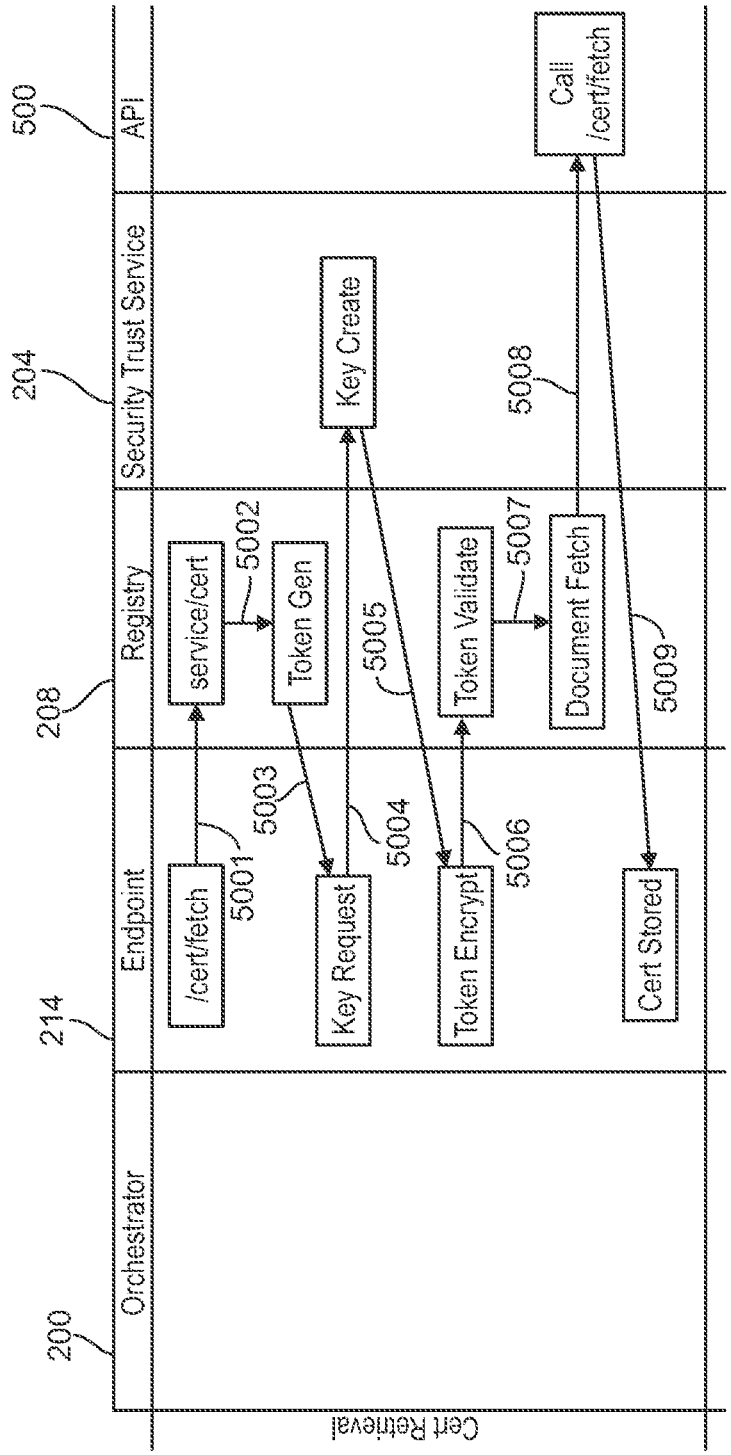
FIG. 5 is a cross-functional flow diagram showing examples of the components shown in FIGS. 3 and 4 plus an additional component and the flow of data between components in a process of retrieving a certificate from a service for embodiments of the invention.

FIG. 5 is a cross-functional flow diagram showing examples of the components shown in FIG. 3 with an additional component and the flow of data between components in a process of retrieving a certificate from a service for embodiments of the invention. Referring to FIG. 5, the components may include the same components as shown in FIGS. 3 and 4 plus, for example, a micro server referred to as API service 500 riding atop the registry 208 that receives requests. Referring further to FIG. 5, in the certificate retrieval process, when the endpoint 214 application or server wants to use a certificate, at 5001, the endpoint 214 may call out to the one or more processors of the registry 208 with a request. At 5002, the one or more processors of the registry 208 may generate a challenge, such as a Boolean challenge, and, at 5003, send the challenge to the endpoint 214 to encrypt the challenge for validation.

Referring further to FIG. 5, at 5004, the one or more processors of the security trust service 204 may create a key for the endpoint 214 and, at 5005, pass it back to the SDK which may then send the encrypted challenge to the one or more processors of the registry 208 at 5006. The one or more processors of the registry 208 may call the one or more processors of the security trust service 204 to confirm that the challenge is validly encrypted and the source of the challenge, and at 5007-5008, the one or more processors of the registry 208 may call up the API service 500, such as a third-party certificate provider or certificate authority, and provide information that it wishes the certificate to include. An example of such a third-party certificate provider or certificate authority may be VENAFI™. At 5009, the API service 500, in its capacity as a certificate authority may produce a certificate and send the certificate to the endpoint 214 for use.

In embodiments of the invention, a process of retrieving a secret, such as a password, most of the process steps may be identical to the steps of the certificate retrieval process of FIG. 5. However, instead of calling an API service, such as a certificate authority, with a certificate request, the endpoint 214 may call back into secrets-as-a-service in the registry, which may determine with which privileged access security backend it needs to communicate and retrieves the requested secret from the particular backend. Examples of privileged access security backends may include, for example an internal backend of the enterprise or a third party vendor such as CYBERARK™ that stores passwords. When so retrieved, the requested password may be encrypted and sent back to the endpoint.

Figure 6:
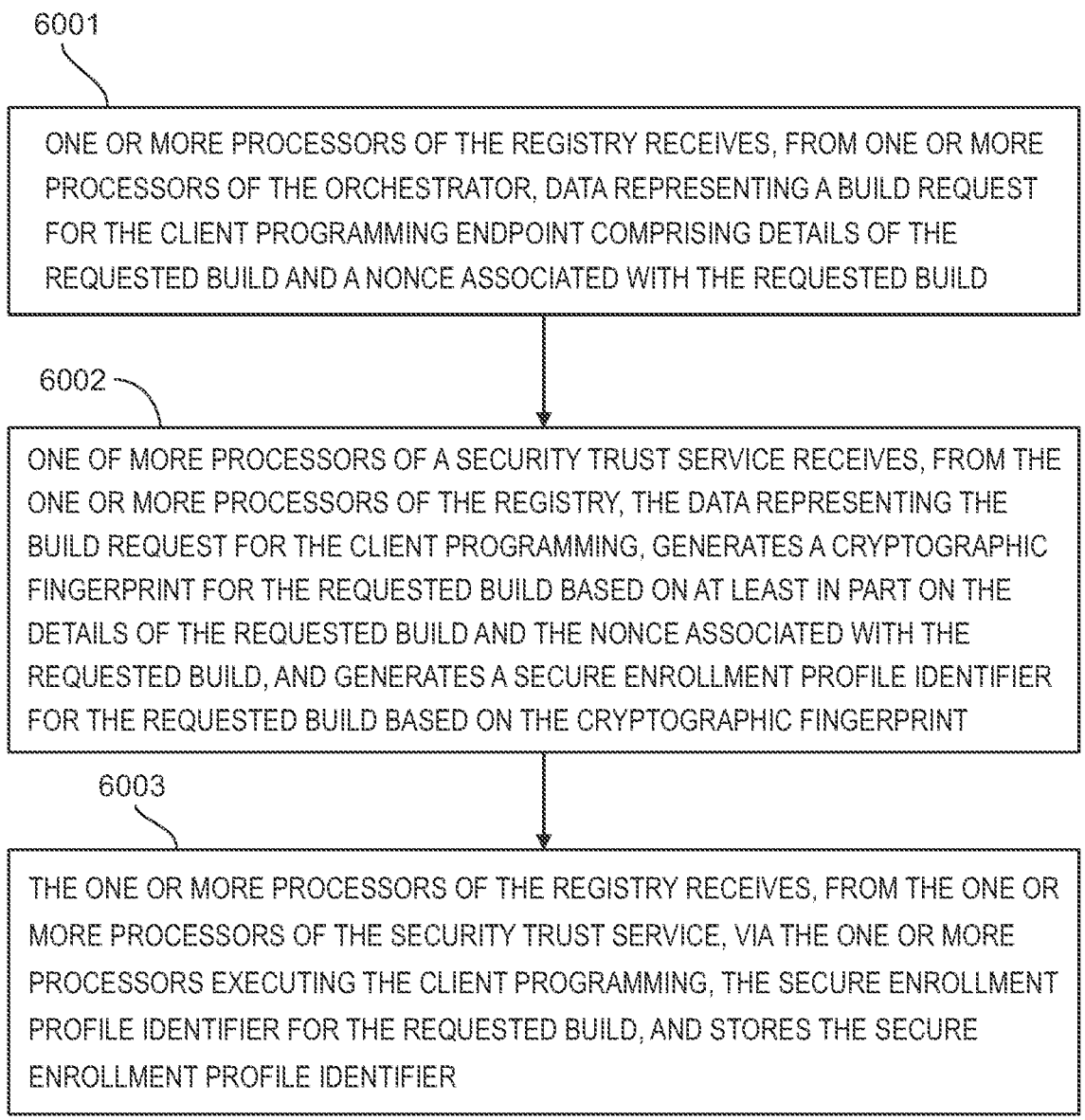
FIG. 6 is a flow chart that illustrates an example of a build and start-up process according to embodiments of the invention.

FIG. 6 is a flow chart that illustrates an example of a build and start-up process according to embodiments of the invention. Referring to FIG. 6, at 6001, one or more processors of the registry 208 may receive, from one or more processors of the orchestrator 200, data representing a build request for the client programming endpoint 214 comprising details of the requested build and a nonce associated with the requested build. At 6002, one or more processors of the security trust service 204 may receive, from the one or more processors of the registry 208, the data representing the build request for the client programming 214, generate a cryptographic fingerprint for the requested build based at least in part on the details of the requested build and the nonce associated with the requested build, and generate a secure enrollment profile identifier for the requested build based on the cryptographic fingerprint. At 6003, the one or more processors of the registry 208 may receive, from the one or more processors of the security trust service 204, via the one or more processors executing the client programming 214, the secure enrollment profile identifier for the requested build, and store the secure enrollment profile identifier.

Figure 7:
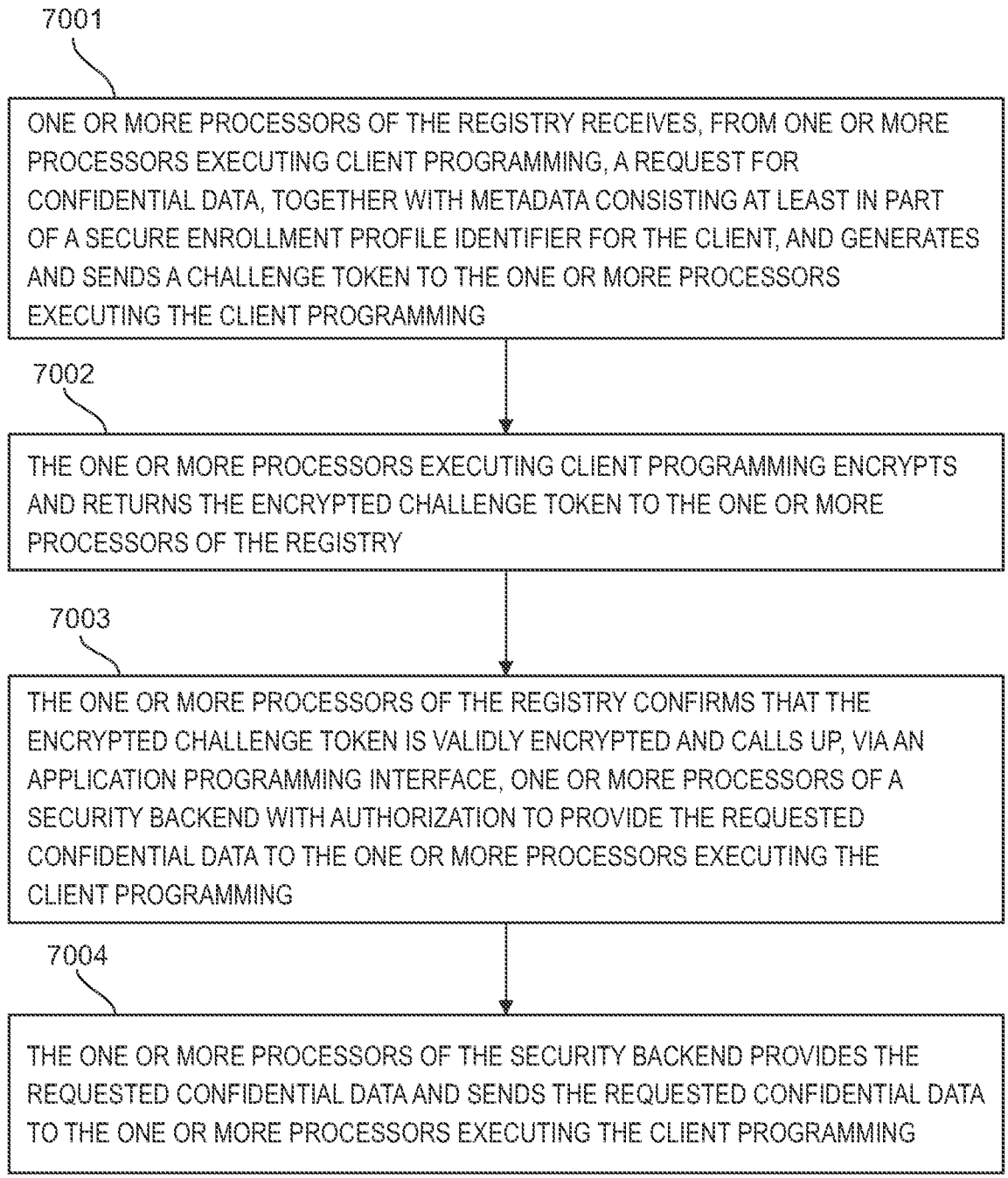
FIG. 7 is a flow chart that illustrates an example of a confidential data authorization process according to embodiments of the invention.

FIG. 7 is a flow chart that illustrates an example of a confidential data authorization process according to embodiments of the invention. Referring to FIG. 7, at 7001, one or more processors of the registry 208 may receive, from one or more processors executing client programming 214, a request for confidential data, together with metadata consisting at least in part of a secure enrollment profile identifier for the client 214, and generate and send a challenge token to the one or more processors executing the client programming 214. At 7002, the one or more processors executing the client programming 214 may encrypt and return the encrypted challenge token to the one or more processors of the registry 208. At 7003, the one or more processors of the registry 208 may confirm that the encrypted challenge token is validly encrypted and call up, via an application programming interface 500, one or more processors of a security backend 204 with authorization to provide the requested confidential data to the one or more processors executing the client programming 214. At 7004, the one or more processors of the security backend 204 may send the requested confidential data to the one or more processors executing the client programming 214.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device to implement the functions/acts specified in the flowchart and/or block diagram block or blocks.

The flowchart and block diagram in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   one or more processors of a registry coupled to memory and programmed to:
   receive, from one or more processors executing client programming, a request for confidential data comprising a public key infrastructure certificate, together with metadata consisting at least in part of a secure enrollment profile identifier for the client;

generate a Boolean challenge token; and send the challenge token to the one or more processors executing the client programming;

the one or more processors executing the client programming being programmed to:

encrypt the encrypted Boolean challenge token; and return the encrypted Boolean challenge token to the one or more processors of the registry;

the one or more processors of the registry being further programmed to:

confirm that the encrypted challenge token is validly encrypted; and call up, via an application programming interface, one or more processors of a security backend with authorization to provide the requested public key infrastructure certificate to the one or more processors executing the client programming; and the one or more processors of the security backend being programmed to:

provide the requested public key infrastructure certificate;

send the requested public key infrastructure certificate to the one or more processors executing the client programming;

the one or more processors of the registry being further programmed to:

receive, from one or more processors of an orchestrator, data representing a build request comprising a nonce associated with the requested build, the request being provided at a time before at least a portion of details of the requested build are provided to the registry; and provide, to the one or more processors of the orchestrator, an approval of the build request before receiving the at least a portion of the build request details.

2. The system of claim 1, the one or more processors of the registry being further programmed to receive, from one or more processors of an orchestrator and at a time after the approval is provided, data representing details of the requested build.

3. The system of claim 2, wherein the nonce associated with the requested build comprises a single-use, time-limited randomized decimal string unique identifier associated with the requested build.

4. The system of claim 3, wherein the details of the requested build comprise one or more of an environment identifier, an application identifier, a container storage interface identifier, a platform identifier, a hard drive identifier, a CPU identifier, an operating system identifier, a MAC address, an IP address, or a work order identifier associated with the requested build.

5. The system of claim 1, further comprising, one or more processors of a security trust service coupled to memory and programmed to receive, from the one or more processors of the registry, the data representing the build request for the client programming, to generate a cryptographic fingerprint for the requested build based at least in part on the details of the requested build and the nonce associated with the requested build, and to generate a secure enrollment profile identifier for the requested build based on the cryptographic fingerprint.

6. The system of claim 2, the one or more processors of the registry being further programmed to receive, from the one or more processors of the security trust service, via the one or more processors executing the client programming, the secure enrollment profile identifier for the requested build, and to store the secure enrollment profile identifier.

7. The system of claim 1, wherein the client programming comprises one of a client virtual machine, a client application, a client system, or a client microservice.

8. The system of claim 1, wherein the requested confidential data further comprises a password.

9. The system of claim 1, the one or more processors executing the client programming being further programmed to encrypt the challenge token with the secure enrollment profile identifier generated by one or more processors of a security trust service communicably coupled to the one or more processors executing the client programming.

10. The system of claim 9, the one or more processors of the security trust service being further programmed to generate the secure enrollment profile identifier based on a cryptographic fingerprint generated by the one or more processors of the security trust service.

11. The system of claim 10, the one or more processors of the security trust service being further programmed to generate the cryptographic fingerprint based at least in part on details of a requested build for the client programming and a nonce associated with the requested build.

12. The system of claim 9, the one or more processors executing the client programming being further programmed to encrypt the challenge token with a randomized hash value using the secure enrollment profile identifier generated by one or more processors of the security trust service.

13. The system of claim 1, wherein the security backend comprises one or more processors of a public key infrastructure service.

14. The system of claim 1, wherein the security backend comprises one or more processors of a password store.

15. The system of claim 1, wherein the security backend comprises one or more processors of an enterprise's internal security backend.

16. A method, comprising:

receiving, by one or more processors of a registry coupled to memory, from one or more processors coupled to memory and executing client programming, a request for confidential data comprising a password, together with metadata consisting at least in part of a secure enrollment profile identifier for the client;

generating, by the one or more processors of the registry, a Boolean challenge token;

communicating, by the one or more processors of the registry, the Boolean challenge token to the one or more processors executing the client programming;

encrypting, by the one or more processors executing the client programming, the Boolean challenge token;

returning, by the one or more processors executing the client programming, the Boolean challenge token to the one or more processors of the registry;

confirming, by the one or more processors of the registry, that the encrypted challenge token is validly encrypted;

calling up, by the one or more processors of the registry, via an application programming interface, one or more processors of a security backend with authorization to provide the requested confidential data to the one or more processors executing the client programming; and communicating, by the one or more processors of the security backend, the requested password to the one or more processors executing the client programming;

receiving, by the one or more processors of the registry and from one or more processors of an orchestrator, data representing a build request for the client programming comprising a nonce associated with the requested build, the request being provided at a time before at least a portion of details of the requested build are provided to the registry; and provide, by the one or more processors of the registry and to the one or more processors of the orchestrator, an approval of the build request before receiving the at least the portion of the build request details.

17. The method of claim 16, further comprising receiving, by the one or more processors of the registry, from one or more processors of an orchestrator, data representing details of the requested build.

18. The system of claim 17, further comprising, receiving, by one or more processors of a security trust service coupled to memory, from the one or more processors of the registry, data representing the build request for the client programming, generating, by the one or more processors of the security trust service, a cryptographic fingerprint for the requested build based at least in part on the details of the requested build and the nonce, and further generating, by the one or more processors of the security trust service, a secure enrollment profile identifier for the requested build based on the cryptographic fingerprint.

19. The system of claim 17, receiving, by the one or more processors of the registry, from the one or more processors of the security trust service, via the one or more processors executing the client programming, the secure enrollment profile identifier for the requested build, and storing, by the one or more processors of the registry, the secure enrollment profile identifier.

\* \* \* \* \*